United States Patent
Svoboda et al.

(10) Patent No.: US 9,420,924 B2
(45) Date of Patent: Aug. 23, 2016

(54) OSCILLATING AIRSTREAM NOZZLE FOR DEBRIS BLOWER

(71) Applicant: THE TORO COMPANY, Bloomington, MN (US)

(72) Inventors: Steven J. Svoboda, Bloomington, MN (US); Chadwick A. Shaffer, Oakdale, MN (US); Dana R. Lonn, Minneapolis, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 14/619,270

(22) Filed: Feb. 11, 2015

(65) Prior Publication Data
US 2015/0233378 A1 Aug. 20, 2015

Related U.S. Application Data

(60) Provisional application No. 61/940,549, filed on Feb. 17, 2014.

(51) Int. Cl.
*E01H 1/08* (2006.01)
*A47L 5/14* (2006.01)
*A01G 1/12* (2006.01)

(52) U.S. Cl.
CPC .......... *A47L 5/14* (2013.01); *A01G 1/125* (2013.01); *E01H 1/0809* (2013.01)

(58) Field of Classification Search
CPC ........ E01H 1/0809; E01H 1/08; A01G 1/125
USPC ....................... 15/327.5, 344, 405
See application file for complete search history.

(56) References Cited

U.S. PATENT DOCUMENTS

| | | |
|---|---|---|
| D91,009 S | 11/1933 | Becker |
| D185,697 S | 7/1959 | Descarries |
| 3,016,066 A | 1/1962 | Warren |
| 3,247,861 A | 4/1966 | Bauer |
| 3,563,462 A | 2/1971 | Bauer |
| 4,122,845 A | 10/1978 | Stouffer et al. |
| 4,132,360 A | 1/1979 | Lee, Jr. |
| 4,231,519 A | 11/1980 | Bauer |
| 4,260,106 A | 4/1981 | Bauer |
| 4,437,392 A | 3/1984 | Stouffer |
| RE31,683 E | 9/1984 | Bauer |
| 4,644,854 A | 2/1987 | Stouffer et al. |
| 4,694,992 A | 9/1987 | Stouffer |

(Continued)

OTHER PUBLICATIONS

"Blower and Blower Vacuums: Instruction Manual" Form No. 90579547. Black & Decker (U.S.) Inc., Towson, Maryland, Copyright 2011, August; 20 pgs.

(Continued)

*Primary Examiner* — David Redding
(74) *Attorney, Agent, or Firm* — Mueting, Raasch & Gebhardt, P.A.

(57) ABSTRACT

A debris blower incorporating a nozzle (e.g., removably attachable nozzle) formed from first and second mating halves, wherein the nozzle provides an airstream that oscillates as a result of dynamic fluid effects of airflow passing through the nozzle. As a result, an oscillating airstream may be produced without the use of complicated moving airflow control elements such as louvers and vanes, and without requiring manual manipulation of the blower by the operator.

21 Claims, 10 Drawing Sheets

(56) References Cited

U.S. PATENT DOCUMENTS

| | | | |
|---|---|---|---|
| 4,774,975 A | 10/1988 | Ayers et al. | |
| RE33,158 E | 2/1990 | Stouffer et al. | |
| RE33,159 E | 2/1990 | Bauer | |
| 5,121,463 A | 6/1992 | Yoshihara | |
| 5,161,317 A | 11/1992 | McDougall | |
| 5,181,660 A | 1/1993 | Stouffer et al. | |
| 5,213,269 A | 5/1993 | Srinath et al. | |
| 5,213,270 A | 5/1993 | Stouffer et al. | |
| 5,333,787 A | 8/1994 | Smith et al. | |
| 5,341,578 A | 8/1994 | Anderson | |
| D350,722 S | 9/1994 | Figueroa | |
| D357,774 S | 4/1995 | Kishi | |
| 5,524,660 A | 6/1996 | Dugan | |
| D377,248 S | 1/1997 | Kishi | |
| D382,683 S | 8/1997 | Henke et al. | |
| 5,689,896 A | 11/1997 | Smetana | |
| 5,876,281 A | 3/1999 | Hirasawa et al. | |
| 5,991,973 A * | 11/1999 | Simpson | A47L 9/0673 15/344 |
| 6,003,199 A | 12/1999 | Shaffer | |
| 6,442,790 B1 | 9/2002 | Svoboda et al. | |
| 6,629,818 B2 | 10/2003 | Svoboda | |
| D533,322 S | 12/2006 | Blateri | |
| D581,342 S | 11/2008 | Cazals | |
| 7,472,847 B2 | 1/2009 | Mukai et al. | |
| D597,715 S | 8/2009 | Barker | |
| D607,622 S | 1/2010 | Blateri | |
| 7,735,188 B2 | 6/2010 | Shaffer | |
| 2003/0127142 A1 | 7/2003 | Stouffer | |
| 2012/0055560 A1 | 3/2012 | Gopalan et al. | |
| 2014/0299672 A1* | 10/2014 | Gopalan | A01G 1/125 239/11 |

OTHER PUBLICATIONS

Chhabra, Vaibhav, "Toroidal Vortex Leaf Blower," including one enlarged image at p. 2 [online]. Retrieved from the Internet on Mar. 18, 2015: <https://vaibhavdesign.wordpress.com/toroidal-vortex-leaf-blower/> Website believed to be available at least as early as Mar. 18, 2013; 2 pages.

"240 MPH Blower Vacuum, Model # BV3800," including two enlarged images at p. 4 [online], Black and Decker Inc. Retrieved from the Internet on Mar. 18, 2015: <http://www.blackanddecker.com/outdoor/BV3800.aspx>. BV3800 product believed to be available at least as early as Feb. 28, 2013; 4 pages.

U.S. Appl. No. 29/482,259, filed Feb. 17, 2014, Shaffer et al.
U.S. Appl. No. 29/490,839, filed May 14, 2014, Martin et al.
U.S. Appl. No. 61/940,549, filed Feb. 17, 2014, Svoboda et al.

* cited by examiner

OSCILLATING AIRSTREAM NOZZLE FOR DEBRIS BLOWER

This application claims the benefit of U.S. Provisional Application No. 61/940,549, filed Feb. 17, 2014, which is incorporated herein by reference in its entirety.

Embodiments of the present disclosure relate generally to outdoor power equipment, and, more particularly, to a nozzle for a debris (e.g., leaf) blower, wherein the nozzle produces an oscillating airstream.

BACKGROUND

Debris blowers (including convertible blower/vacuum units (also referred to herein as "blower/vacs")) are commonly used by homeowners and professionals alike for the removal of debris from yards, driveways, sidewalks, etc. As used herein, a convertible blower/vac is a device which can be configured for use as either a debris blower or debris vacuum. When used as a vacuum, vacuum attachments coupled to a housing of the blower/vac permit leaves or similar debris to be vacuumed into an attached bag or other debris container.

Blower/vacs configured as blowers (as well as dedicated "blower-only" devices) may produce a fast moving stream of air generated by a rotating impeller located within the blower housing. The impeller draws air into the housing through an air entrance and exhausts an accelerated air stream through an air exit. The air stream is often channeled through a tapered blower tube. In addition to providing a more precisely focused air stream, the tapered blower tube may also contribute to an air stream of greater velocity. By manually moving the blower slightly side-to-side, the air stream generated by the blower may effectively "sweep" debris along a ground surface (e.g., hardscape such as a sidewalk or the like).

While operator movement of the blower is effective in providing the desired sweeping motion, drawbacks exist. For example, except for very narrow surfaces, continuous operator motion is needed to ensure effective sweeping over the target area. Once again, while lightweight blowers permit such continuous motion with minimal operator fatigue, some users may benefit from a blower that can provide the desired sweeping motion with little or no operator manipulation.

Such a motion could be accommodated by a nozzle that mechanically directs the air stream side-to-side. While effective, such a nozzle may require multiple moving parts and may further be relatively expensive to produce as compared to a conventional blower nozzle.

SUMMARY

Embodiments of the present disclosure may overcome these and other issues by providing, in one embodiment, a debris blower having: a housing defining an air exit opening; a motor-driven impeller adapted to accelerate air and expel the air through the air exit opening; and a blower tube having a first end and a second end, the first end adapted to attach to the housing at the air exit opening. Also included is a nozzle adapted to attach to the second end of the blower tube. The nozzle includes first and second mating halves secured to one another, wherein the assembled first and second mating halves form: a first end defining an air inlet of complementary shape to the second end of the blower tube; and a second end defining an air outlet. The nozzle is adapted to produce an airstream at the air outlet that oscillates back-and-forth along an axis of the air outlet, wherein movement of the air through fixed passageways of the nozzle alone produces the oscillating airstream.

In another embodiment, nozzle adapted to removably attach to an outlet of a debris blower is provided. The nozzle includes first and second mating halves secured to one another, wherein the assembled first and second mating halves together form: a first end defining an air inlet; and a second end defining an air outlet. The nozzle is adapted to produce an airstream at the air outlet that oscillates back-and-forth along an axis of the air outlet, wherein movement of air through fixed passageways of the nozzle alone produces the oscillating airstream.

In yet another embodiment, a nozzle adapted to removably attach to a distal end of a blower tube extending outwardly from a debris blower is provided. The nozzle includes: first and second mating halves secured to one another, wherein the assembled first and second mating halves together form: a first end defining an air inlet; and a second end defining a rectangular air outlet. The nozzle is adapted to produce an airstream at the air outlet that oscillates back-and-forth along a long axis of the air outlet, wherein movement of air through fixed passageways of the nozzle alone produces the oscillating airstream. The first mating half includes a latching tab adapted to selectively engage a protrusion formed on an exterior surface of the blower tube when the distal end of the blower tube is partially received within the air inlet of the nozzle.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
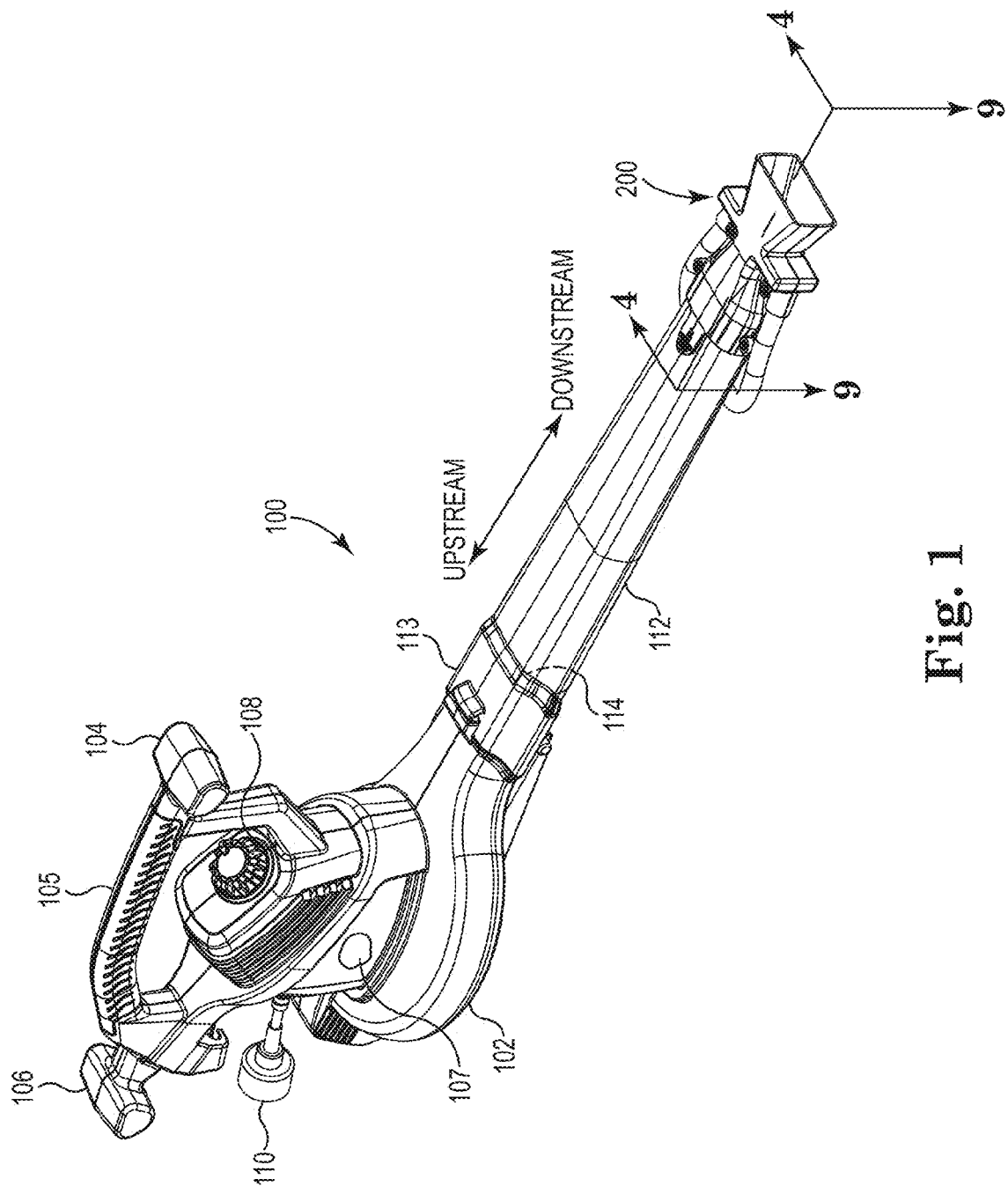
FIG. 1 is a perspective view of a debris blower (e.g., a convertible blower/vac configured in a blower mode) incorporating an oscillating airstream nozzle in accordance with one embodiment of the disclosure, the nozzle shown attached to a second or outlet end of a blower tube that is itself attached to an air exit of a housing of the blower.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may or may not be described and/or illustrated herein, are certainly contemplated.

The disclosures of U.S. Pat. No. 6,442,790 (Svoboda et al.), U.S. Pat. No. 6,629,818 (Svoboda), and U.S. Pat. No. 7,735,188 (Shaffer) are incorporated herein by reference in their respective entireties.

As used herein, the term "upstream" refers to a direction or location that is toward a housing 102 (see FIG. 1), while the term "downstream" refers to a direction or location that is more towards an outlet or distal end of a blower tube 112. Moreover the phrase "removably attach" or the like is used herein to refer to an attachment mechanism that allows for simple, expedient, and repeatable coupling of one component to, and decoupling from, a second component preferably without the use of tools. For example, removably attaching a nozzle to a blower tube as described herein could include attaching and ultimately completely removing the nozzle from the tube (see, e.g., FIG. 2), hingedly attaching the nozzle to the tube so that it may be moved from an operative position (see, e.g., FIG. 1) to an inoperative position, tethering the nozzle to the tube so that, like the hinge connection, it remains connected to the tube when the nozzle is in an inoperative position, etc.

Embodiments as described and illustrated herein are directed to debris blowers (e.g., leaf blowers) incorporating a nozzle that may generate an oscillating air flow from an outlet of the nozzle. As a result, blowers in accordance with embodiments of the present disclosure may produce an output airstream that oscillates in a side-to-side manner to facilitate sweeping of hardscapes and the like. Moreover, embodiments like those described herein may produce such an oscillating airstream without the use of movable parts such as vanes or louvers associated with the blower and/or nozzle. While in some embodiments the nozzle may be removably attached to the blower or to a tube extending from the blower, other embodiments may use a different, e.g., permanently mounted, nozzle.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective observed in the particular figure, or as observed when the blower is in a typical operating orientation (see, e.g., FIG. 1). These terms are used only to simplify the description, however, and not to limit the scope of any embodiment described.

The suffixes "a" and "b" may be used throughout this description to denote various left- and right- side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the other part/feature (e.g., part/feature identified with a "b" suffix). Similarly, the description of a part/feature identified with no suffix may apply, unless noted otherwise, to both the corresponding left and right part/feature.

With reference to the drawing, wherein like reference numerals designate like parts and assemblies throughout the several views, FIG. 1 is a perspective view of a portable, electric debris blower/vacuum 100 (also referred to herein as "blower" or "blower/vac") in accordance with one embodiment of the disclosure. While embodiments are illustrated in conjunction with corded electric blowers, those of skill in the art will appreciate that most any type of blower, e.g., gas-engine powered units or battery-powered units, may benefit from the concepts described and/or illustrated herein. Moreover, while shown as embodied in a handheld blower, those of skill in the art will realize that nozzles in accordance with embodiments of the present disclosure may also be utilized with other, e.g., more powerful and/or wheeled, debris blowers.

Figure 9:
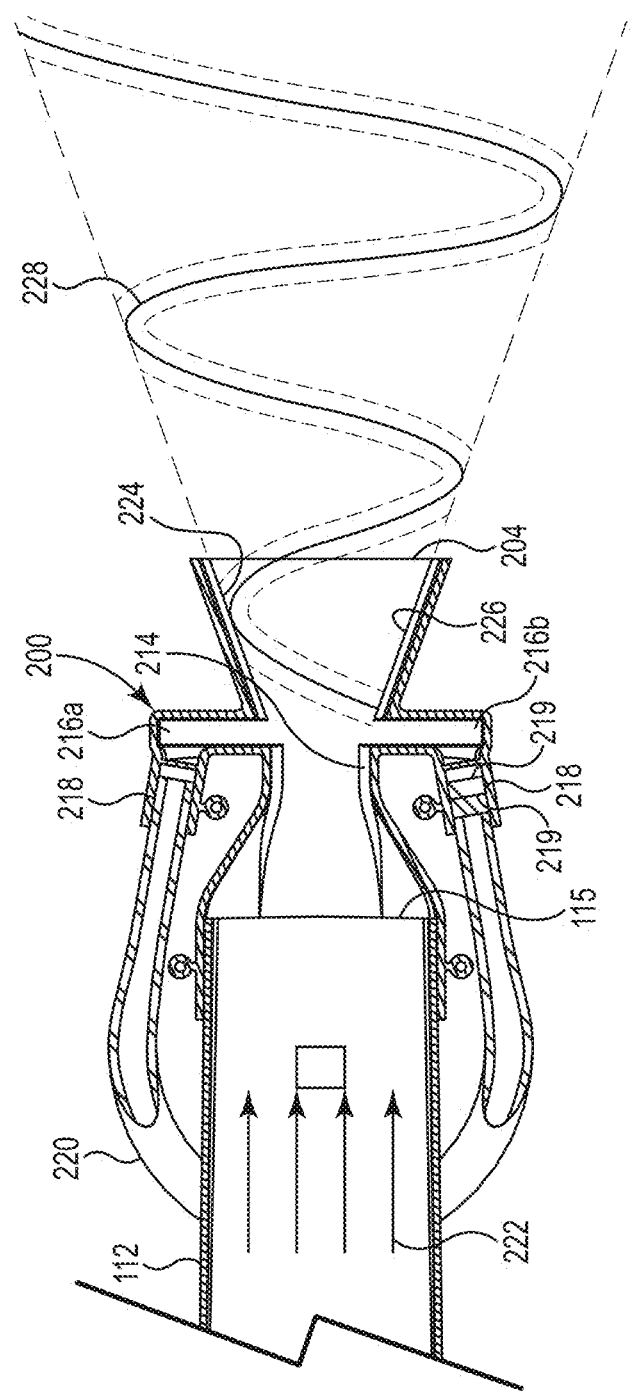
FIG. 9 is a section view taken along line 9-9 of FIG. 1 illustrating an oscillating air stream produced by the nozzle.

As the name suggests, a blower/vac may be configured to operate in either a blower mode (as shown in FIG. 1) or in a vacuum mode (not shown, but see FIG. 9 of U.S. Pat. No. 7,735,188). Regardless of the operating mode, the blower 100 may generally include a blower housing 102 having one or more handles 104, 105, and 106 adapted to receive hands of an operator during use. The housing 102 may, at least in one embodiment, further include a power cord 110 for receiving external AC power.

While illustrated herein in combination with a convertible blower/vac, nozzles like those described herein are equally applicable to units configurable as blower-only machines. Thus, the term debris "blower" is understood to encompass both convertible blower/vac units and dedicated blowers. As nozzles in accordance with embodiments of the present disclosure are intended for use when the unit 100 is configured as a blower, vacuum functionality of the unit 100 is not further described herein.

To selectively control delivery of electrical power to a motor 107 located within the housing, a switch 108 may be provided. In one embodiment, the switch 108 is coupled, e.g., in series, between the power cord 110 and the motor 107. The switch 108 may merely open or close the power delivery circuit or, alternatively, may vary the power to the motor to provide adjustable motor speed.

When operating in blower mode as shown in FIG. 1, the blower 100 may include a blower tube 112 extending outwardly from the housing 102 and having a first or proximal ("upstream") end 113 that removably attaches to an air exit opening 114 of the housing 102. In the illustrated embodiment, coupling may be achieved by sliding the proximal female end 113 of the blower tube over a tubular male portion of the housing that defines the air exit opening 114.

The blower tube 112 may taper from the first or proximal end 113 to a second distal or outlet end 115 as shown in FIG.

2. The taper of the blower tube 112 may be advantageous as it permits improved focusing of the high velocity air stream produced by the blower 100.

While not necessary to an understanding of embodiments described herein, the housing 102 may preferably be formed from mating plastic (e.g., acrylonitrile butadiene styrene (ABS)) halves which, when assembled, define an interior cavity. The cavity may enclose not only the motor 107, but an impeller 116 (shown diagrammatically in FIG. 2) attached to an output shaft of the motor. When external electrical power is provided to the motor 107, the impeller 116 may rotate within a volute formed by the housing. As it rotates, the impeller 116 draws air into the housing 102 (e.g., through an air entrance located on the bottom of the housing (not shown)), accelerates the air, and exhausts/expels the accelerated air through the air exit opening 114 and into the attached blower tube 112.

Figure 2:
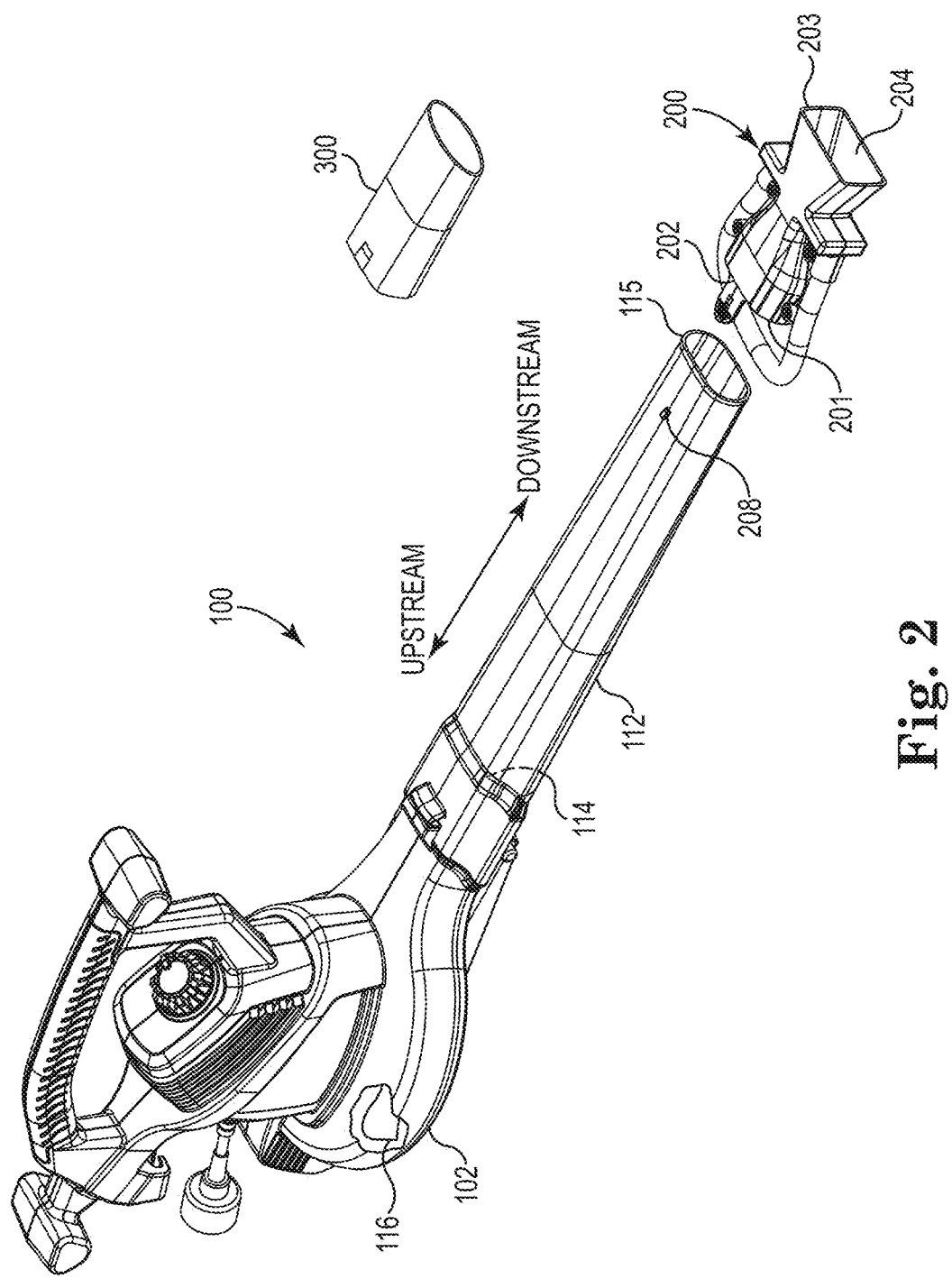
FIG. 2 is a view similar to FIG. 1, but with the nozzle shown removed from the blower tube and an optional secondary nozzle shown, wherein the blower, blower tube, and both nozzles may form a kit or assembly.

In some embodiments, the blower 100 may form part of a kit that further includes a secondary, concentrator nozzle 300 as shown in FIG. 2 that may be used in place of nozzle 200 (described below). The concentrator nozzle 300 may, before attachment of the blower tube 112 to the housing 102, be dropped into the first end 113 where it may then fall to the second end 115 and lodge in place such that it partially protrudes from the second end of the blower tube. The concentrator nozzle may optionally be utilized when a concentrated air stream from the blower is desired (e.g., when cleaning sidewalk cracks or the like). For more information regarding exemplary concentrator nozzles, see U.S. Pat. No. 6,003,199 to Shaffer.

Figure 3:
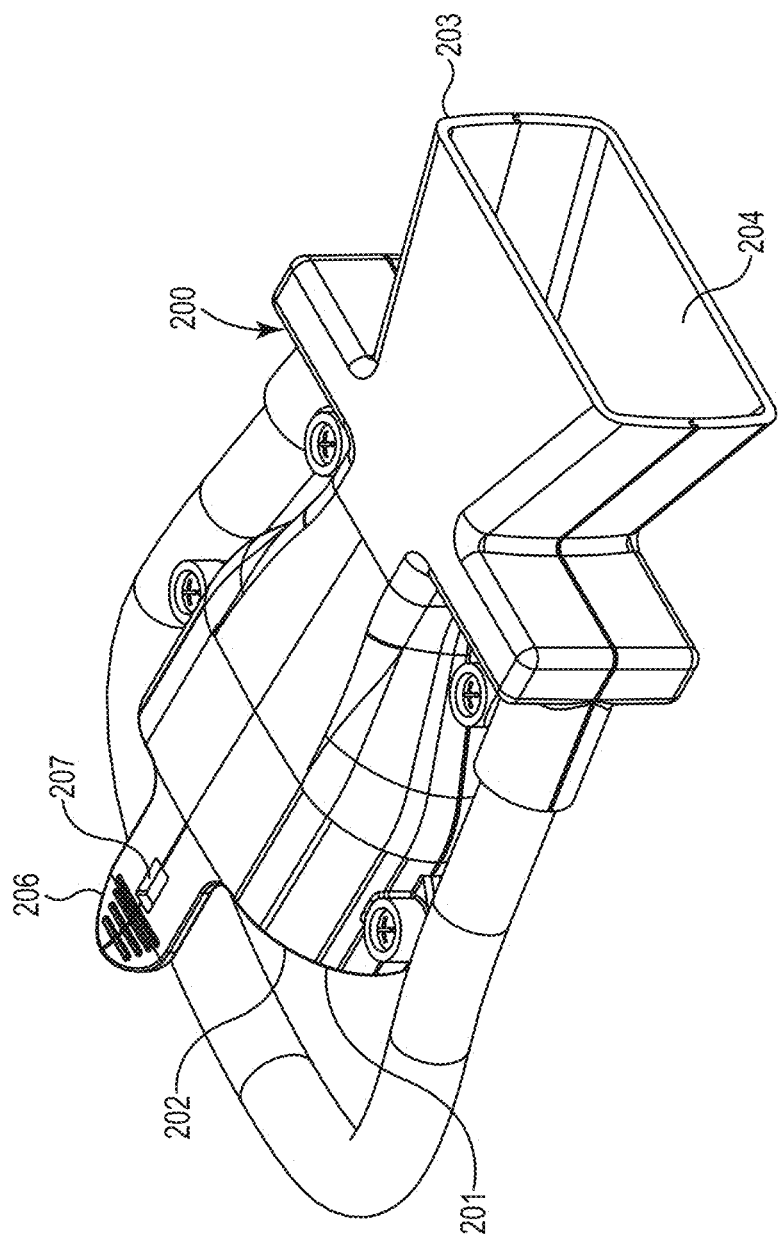
FIG. 3 is an enlarged perspective view of the nozzle of FIG. 2.

With this general introduction, a nozzle 200 in accordance with one embodiment will now be described with initial reference to FIG. 3 (as an initial note, the nozzle 200 may generally be used with the blower 100/blower tube 112 when the optional nozzle 300 is removed from the blower tube 112). The exemplary nozzle 200 may be adapted to attach to the second end 115 of the blower tube 112 such that the airflow produced by the blower 100 passes through the nozzle. Accordingly, the nozzle may include a first or upstream end 201 defining an air inlet 202 in fluid communication with the air exit opening 114 of the housing 102 (via the blower tube 112). The nozzle may further include a second or downstream end 203 forming an air outlet 204 of the nozzle. In the illustrated embodiment, the nozzle is constructed such that the air outlet 204 remains fixed in position relative to the air inlet 202 at all times. Moreover, the air outlet includes or otherwise forms a primary opening having a transverse dimension and a height dimension, wherein the transverse dimension is greater than the height dimension (e.g., the air outlet 204 may be defined by a rectangular air opening having a long axis 213 (see FIG. 7)). Such a construction provides a broad transverse dimension over which to generate the desired side-to-side sweeping action as further described below.

Figure 4:
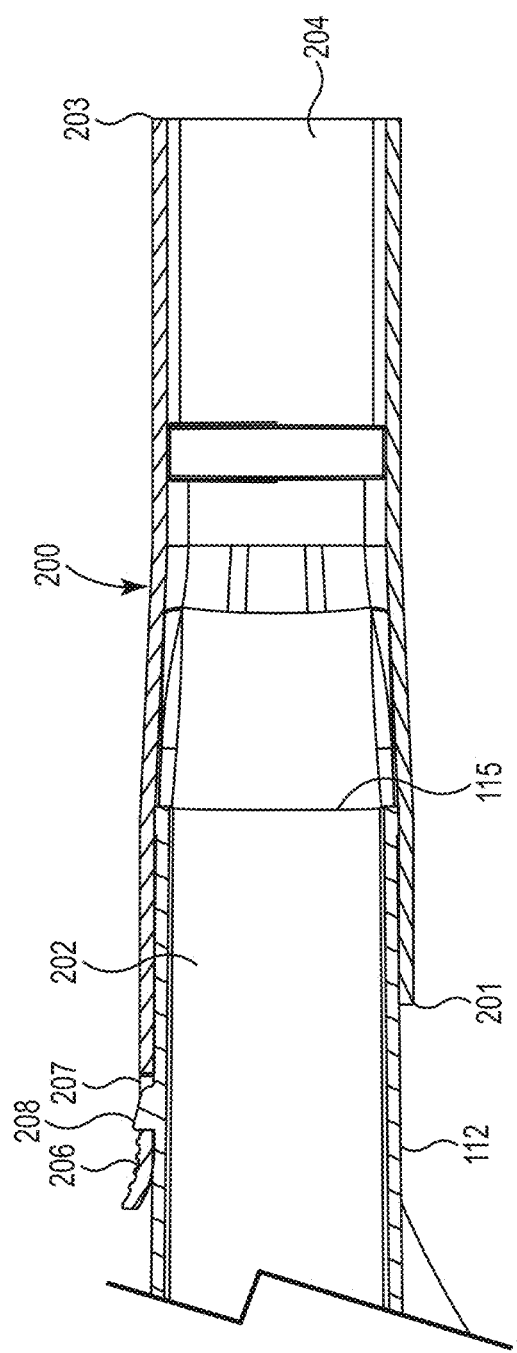
FIG. 4 is a section view taken along line 4-4 of FIG. 1 (some structure removed for clarity)
Figure 5:
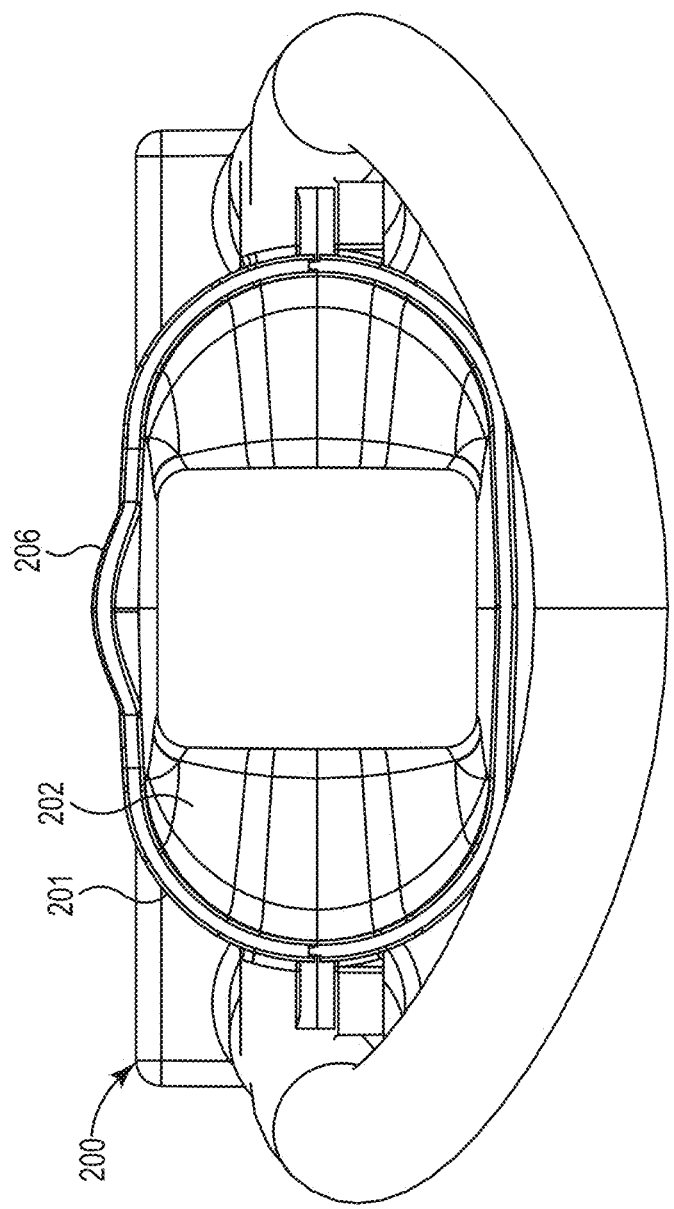
FIG. 5 is a first end view of the nozzle of FIG. 3 illustrating an air inlet of the nozzle.

In order to ensure positive connection between the blower tube 112 and the nozzle 200, the first end 201 (i.e., the air inlet 202) of the nozzle may form a female opening having a cross sectional shape complementary to a cross sectional shape of the second end 115 of the blower tube 112. For example, the second end 115 of the blower tube 112 and the first end 201 (e.g., air inlet 202) of the nozzle 200 are, in the illustrated embodiment, obround in shape as indicated in FIG. 2 (blower tube) and FIG. 5 (nozzle). Moreover, as shown in the cross-sectional view of FIG. 4, the nozzle 200 may taper (converge) downstream from the first end 201. As a result, the second end of the blower tube 112 may be received (e.g., removably received) within, and seal tightly against, an inner surface of the nozzle (e.g., with an interference fit) in such a way as to minimize air leakage at the interface. In some embodiments, the nozzle 200 may include a latching, deflectable tab 206 defining an opening 207 (see FIG. 3) configured to receive and engage a protrusion 208 (see also FIG. 2) formed on an exterior surface of the blower tube 112 when the two components are connected as shown in FIG. 4. The tab 206/protrusion 208 combination forms a positive locking mechanism to ensure that the nozzle is not inadvertently separated from the blower tube during use. While the tab 206 and protrusion 208 are shown on the nozzle 200 and tube 112 respectively, they may be reversed (e.g., tab 206 on the tube 112 and protrusion 208 on the nozzle 200) in other embodiments. Moreover, other positive locking devices now known or later developed may also be substituted for the tab/protrusion illustrated in the figures. While shown as utilizing a blower tube to form the ultimate outlet of the blower, other embodiments may attach the nozzle 200 directly to an outlet (e.g., air exit opening 114) of the blower itself.

Figure 6:
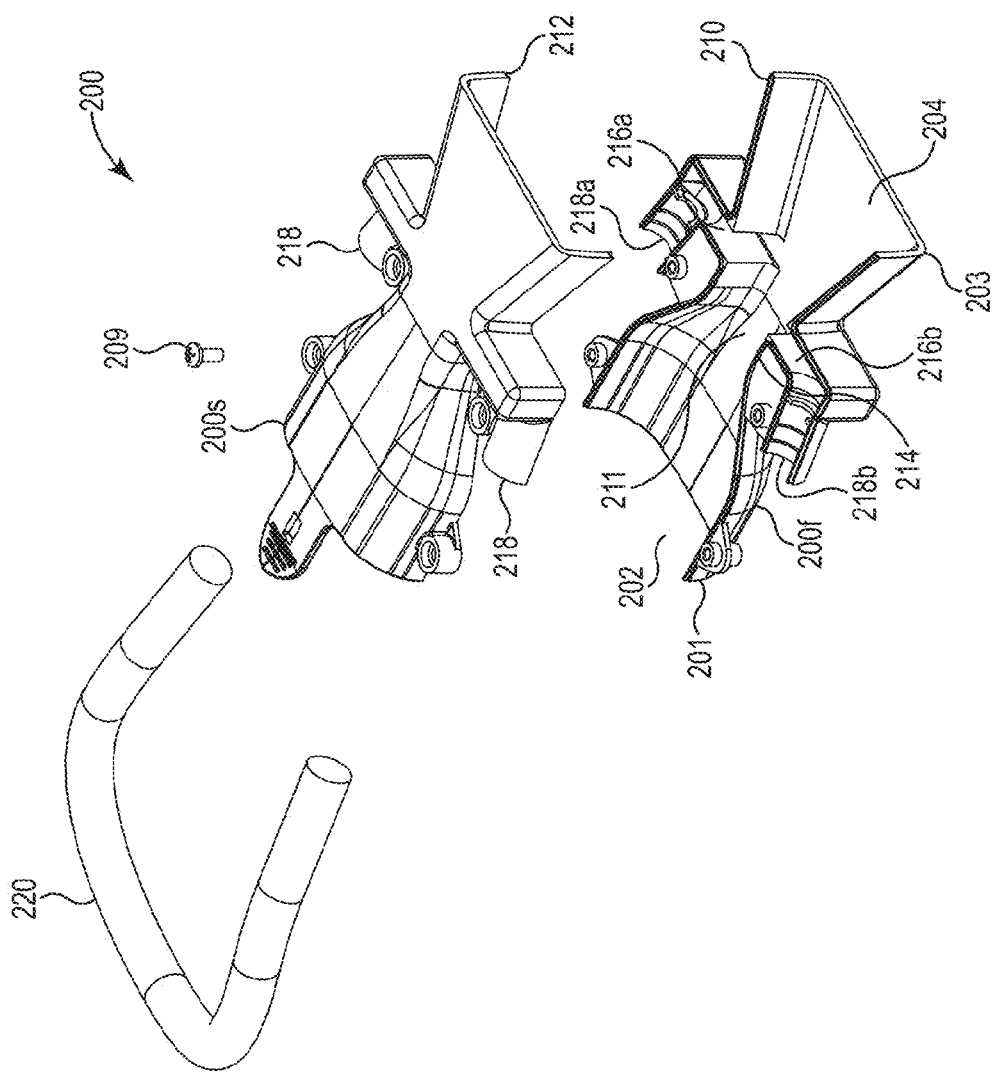
FIG. 6 is an exploded view of the nozzle of FIG. 3.
Figure 7:
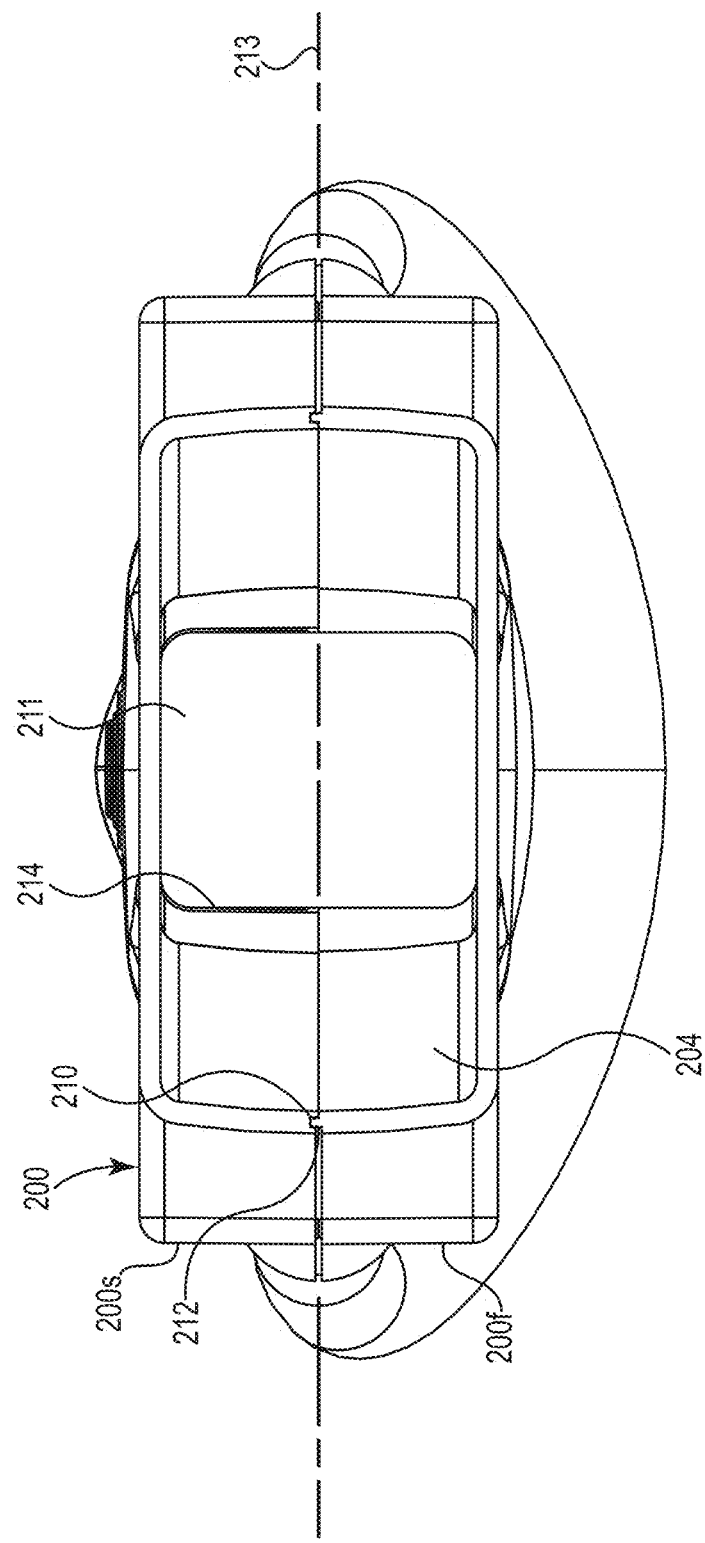
FIG. 7 is a second or opposite end view of the nozzle of FIG. 3 illustrating an air outlet of the nozzle.
Figure 8:
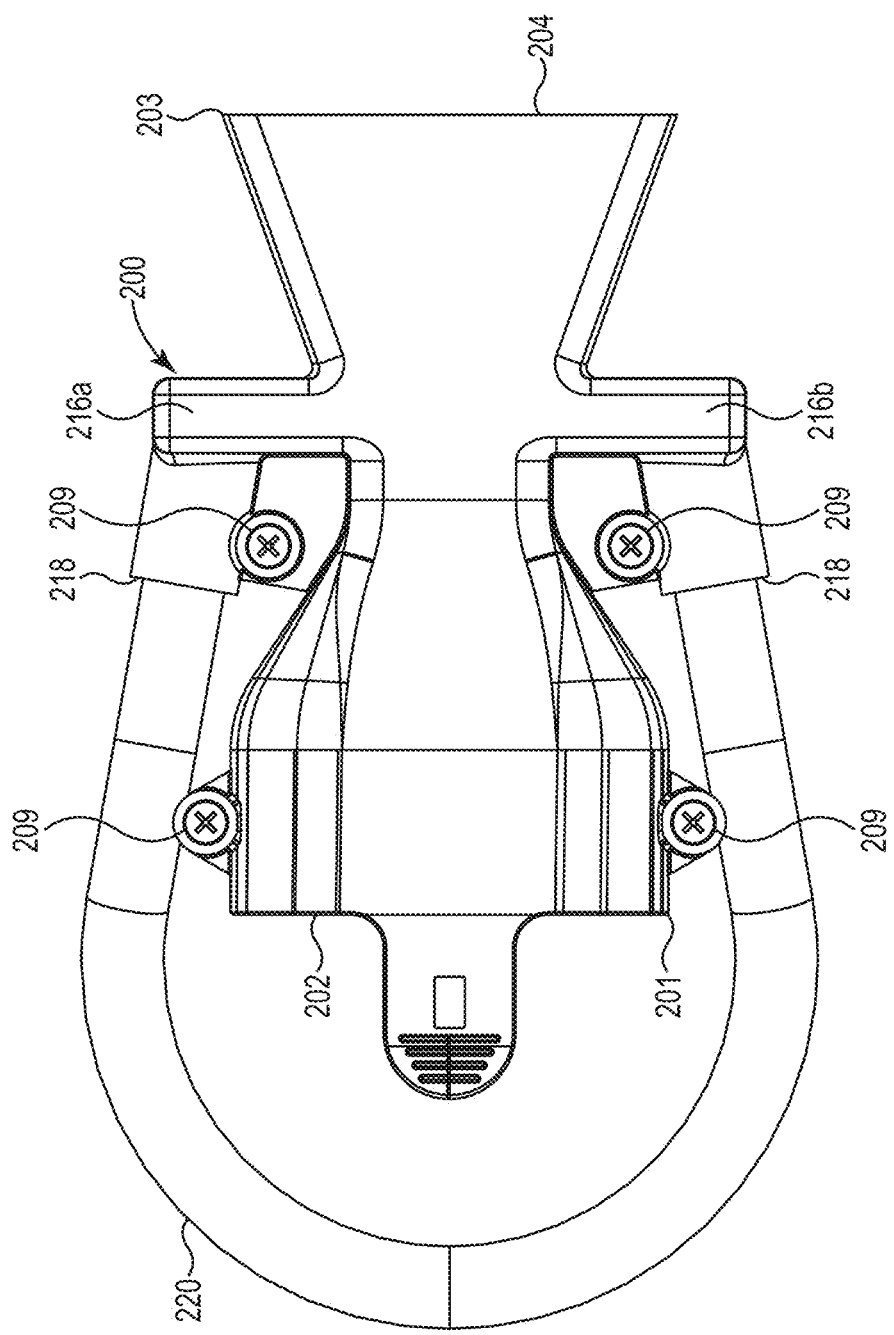
FIG. 8 is a top plan view of the nozzle of FIG. 3.

With reference now to FIGS. 6-8, construction of the exemplary nozzle 200 will now be described. As shown in FIG. 6, the nozzle 200 may be constructed as two mating halves (first half 200f and second half 200s) that are secured to one another (e.g., fastened to one another with fasteners 209 (only one illustrated in FIG. 6, but see FIG. 8)). For example, the mating halves may together form: the first end 201 defining the air inlet 202 and the second end 203 defining the air outlet 204. In one embodiment, the two halves may be constructed of ABS plastic, although other materials are certainly contemplated.

The mating edges of the halves 200f, 200s may include features to permit sealing to one another to minimize air leakage between the halves. For example, in the illustrated embodiment, one half (e.g., first half 200f) may include a tongue 210 formed along some or all of the mating edge or surface of the part. The tongue 210 is designed to engage a groove 212 formed along some or all of the mating edge or surface of the other half (second half 200s) when the two mating halves are assembled. While described as a tongue-and-groove construction, other embodiments may utilize other sealing techniques (e.g., compressible seals, sealant beads, interference fits, etc.) to provide the desired sealing effect.

The first and second mating halves may, in one embodiment, each form portions of both the air inlet and the air outlet. (e.g., the two mating halves may contact one another generally along a plane containing the long axis 213 of the air outlet 204 as shown in FIG. 7). As evident in FIG. 6, the nozzle 200 may further form a structure defining a passageway 211 extending from the air inlet 202 to the air outlet 204. Downstream of the air inlet 202, the passageway may reduce or converge to create a throat 214, after which the passageway may diverge towards the rectangular air outlet 204 (see also FIG. 7).

Positioned between the throat 214 and the air outlet 204 are two connection chambers 216 (e.g., 216a and 216b), one formed on each transverse side of the passageway downstream of the throat 214. Each connection chamber 216a and 216b is in fluid communication with a port 218 (218a and 218b, respectively) formed on its respective side of the nozzle 200. The two ports 218 are connected to one another via a flexible (e.g., silicone or polyurethane) tube 220. While illustrated as a flexible tube 220, other conduits that provide an interconnection or passageway between the connection chambers 216 may be utilized. As one of skill may appreciate, all the passageways formed by and within the nozzle (e.g., the air inlet 202 and air outlet 204, the throat 214, the connection chambers 216, the tube 220, etc.) may be fixed relative to one another during operation, i.e., the nozzle may include no moving parts.

The tube 220 may be sized (e.g., diameter and length) to provide the desired oscillatory effect during operation. As indicated in FIG. 8, the tube may be oriented to extend upstream (toward the blower housing 202 of FIG. 1) beyond the first end 201 of the nozzle 200. The tube 220 may be configured to sit beneath and in close proximity to the blower tube 112 when the nozzle is installed (as shown in FIG. 1) to minimize the chances that the tube 220 may inadvertently catch on objects during use. In the illustrated embodiment, one or both of the two halves 200f, 200s may include protruding portions or ribs 219 located within each of the ports 218 (see, e.g., FIG. 9). The ports 218 are sized such that when the two halves 200f, 200s are secured to one another, adequate clamping is produced to ensure that the protruding ribs have sufficient "bite" into the tube 220 to maintain the tube in place during nozzle 200 usage.

Referring now to FIG. 9, the general operation of the nozzle will be described. Initially, airflow 222 (generated within the blower housing 102) passes through the blower tube 112 and enters the nozzle 200 where it converges through the throat 214. After the airflow passes through the throat, it tends to attach to one side or the other (e.g., side 224) of the nozzle. As a result, an area of low pressure is formed in one chamber (e.g., chamber 216a) relative to the other chamber (chamber 216b). In response to this pressure differential between the two chambers 216a and 216b, air contained within the tube 220 (the "air column") is believed to accelerate from the higher pressure area (e.g., chamber 216b) toward the lower pressure area (e.g., chamber 216a). This acceleration "pushes" the airflow attached to side 224 toward side 226. Ultimately, the airstream detaches from side 224 and moves across the nozzle to side 226 where it then attaches. As this occurs, the pressure differential between the chambers 216a and 216b reverses, causing the air column to accelerate in the opposite direction (e.g., toward the chamber 216b), thereby pushing the airstream back toward side 224. This process continues in a repeating fashion such that the nozzle produces an airstream 228 (at the air outlet 204) that oscillates back-and-forth (e.g., side-to-side) along an axis, e.g., the long axis (transverse dimension), of the air outlet 204.

The frequency of this flow oscillation may be tuned by changing various nozzle parameters including, for example, the length, inner diameter, and compliance of the tube 220, and/or the size of the throat 214. For example, in the illustrated embodiment, the tube 220 is about 15 inches long with an inner diameter of about ⅜ inches and a wall thickness of about ⅛ inches, with the throat 214 being about 1.3 inches by 1.5 inches. In such a configuration, an oscillation frequency of the airstream of about 15-40 Hertz may be produced.

For a more detailed description of the fluid mechanism that causes the airstream oscillation in the nozzle 200, see U.S. Pat. No. 7,472,847 (Mukai et al.), U.S. Pat. No. 4,231,519 (Bauer) and U.S. Pat. No. 4,644,854 (Stouffer et al.).

As a result of the oscillation produced by the tube 220, the airstream exiting the nozzle 200 moves back-and-forth from one side or wall 224 to the opposite side or wall 226. Stated alternatively, the airstream 228 exiting the nozzle 200 may sweep from side-to-side as generally indicated in FIG. 9. By manipulating the divergence angle of the nozzle 200, the width of the effective airstream may be controlled to achieve the desired sweeping action.

Figure 10:
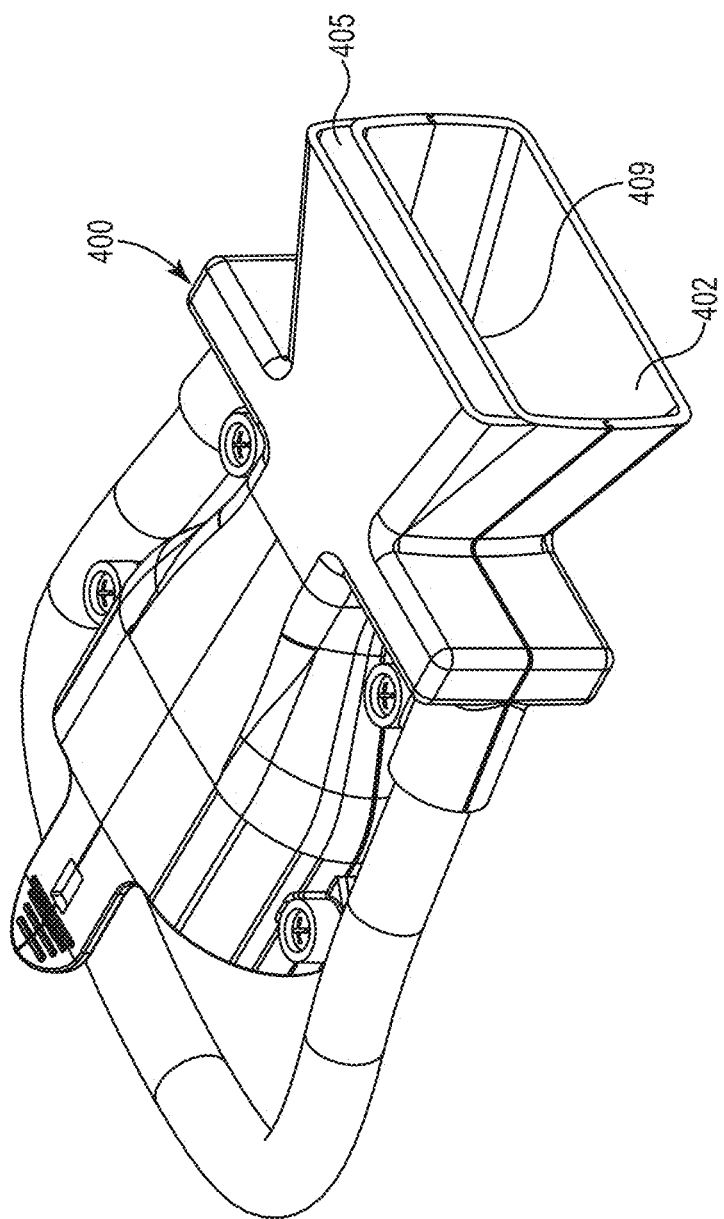
FIG. 10 is a perspective view of a nozzle in accordance with another embodiment of the disclosure.

FIG. 10 illustrates a nozzle 400 in accordance with an alternative embodiment. The nozzle 400 is substantially identical to the nozzle 200 with the exception that the nozzle 400 further incorporates a secondary opening or air outlet 405 that, at least in one embodiment, is positioned proximate (e.g., above) a primary opening or outlet 402. The secondary air outlet 405 may be formed by a divider or wall 409 placed across the long axis of the air outlet 402. The divider bifurcates the airstream produced by the nozzle 400 to provide a secondary airflow out of the outlet 405. This secondary airflow may act as a "curtain" to reduce the chances that debris will blow upwardly during blower operation. In the illustrated embodiment, the secondary airflow may oscillate in synchronization with the primary airflow out of the air outlet 402 (i.e., the airflow through outlet 405 synchronously oscillates with the airflow through the air outlet 402). Alternatively, the secondary air outlet 405 may provide a non-oscillating airstream in conjunction with the primary oscillating airstream. Such an embodiment may be provided by configuring the nozzle such that the secondary airstream bypasses the chambers 216a and 216b.

Embodiments of the present disclosure thus permit a blower to achieve a sweeping airstream without requiring either: manual manipulation (e.g., side-to-side rocking) of the blower by the operator; or movable directional components associated with the nozzle and/or blower (e.g., vanes or the like). Rather, the oscillation in the airstream may be induced solely by characteristics of the air entering the air inlet and moving past/interacting with fixed passageways (e.g., throat 214, connection chambers 216, tube 220, etc.) formed within the nozzle.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments are described and reference has been made to possible variations of the same. These and other variations, combinations, and modifications will be apparent to those skilled in the art, and it should be understood that the invention is not limited to the illustrative embodiments set forth herein.

What is claimed is:
1. A debris blower comprising:
   a housing defining an air exit opening;
   a motor-driven impeller adapted to accelerate air and expel the air through the air exit opening;
   a blower tube having a first end and a second end, the first end adapted to attach to the housing at the air exit opening; and
   a nozzle adapted to attach to the second end of the blower tube, the nozzle comprising first and second mating halves secured to one another, wherein the assembled first and second mating halves form: a first end defining an air inlet of complementary shape to the second end of the blower tube; and a second end defining a primary air outlet and a secondary air outlet proximate the primary air outlet, the nozzle adapted to produce an airstream at the primary air outlet that oscillates back-and-forth along an axis of the primary air outlet, wherein movement of the air through fixed passageways of the nozzle alone produces the oscillating airstream.

2. The blower of claim 1, wherein the second end of the blower tube and the air inlet are obround in shape.

3. The blower of claim 1, wherein either the nozzle or the blower tube comprises a deflectable tab adapted to engage a protrusion on the other of the nozzle or the blower tube to secure the nozzle to the blower tube.

4. The blower of claim 3, wherein the tab is formed on the nozzle.

5. The blower of claim 1, wherein the air inlet of the nozzle is adapted to receive therein the second end of the blower tube with an interference fit.

6. The blower of claim 1, wherein the first mating half comprises a tongue adapted to engage a groove formed in the second mating half when the two mating halves are assembled.

7. The blower of claim 1, further comprising a kit that includes a secondary concentrator nozzle adapted to replace the nozzle at the second end of the blower tube.

8. The blower of claim 1, wherein the first and second mating halves each form portions of both the air inlet and the primary air outlet.

9. The blower of claim 1, wherein the nozzle is adapted to produce a non-oscillating airstream at the secondary air outlet.

10. The blower of claim 1, wherein the nozzle is adapted to produce a second oscillating airstream at the secondary air outlet.

11. A nozzle adapted to removably attach to an outlet of a debris blower, the nozzle comprising first and second mating halves secured to one another, wherein the assembled first and second mating halves together form: a first end defining an air inlet; and a second end defining a primary air outlet and a secondary air outlet proximate the primary air outlet, the nozzle adapted to produce an airstream at the primary air outlet that oscillates back-and-forth along an axis of the primary air outlet, wherein movement of air through fixed passageways of the nozzle alone produces the oscillating airstream.

12. The nozzle of claim 11, wherein the nozzle is adapted to removably attach to the outlet of the debris blower via an interference fit.

13. The nozzle of claim 11, further comprising a blower tube forming the outlet of the debris blower, wherein the nozzle comprises a deflectable tab adapted to engage a protrusion formed on the blower tube.

14. The nozzle of claim 11, wherein the first mating half comprises a tongue adapted to engage a groove formed in the second mating half when the first and second mating halves are assembled.

15. The nozzle of claim 11, wherein the air inlet of the nozzle and the outlet of the debris blower are obround in shape.

16. A nozzle adapted to removably attach to a distal end of a blower tube extending outwardly from a debris blower, wherein the nozzle comprises:
  first and second mating halves secured to one another, wherein the assembled first and second mating halves together form: a first end defining an air inlet; and a second end defining a rectangular air outlet, the nozzle adapted to produce an airstream at the air outlet that oscillates back-and-forth along a long axis of the air outlet, wherein movement of air through fixed passageways of the nozzle alone produces the oscillating airstream, and wherein the first and second mating halves further define a secondary air outlet at the second end proximate the rectangular air outlet; and
  wherein the first mating half comprises a latching tab adapted to selectively engage a protrusion formed on an exterior surface of the blower tube when the distal end of the blower tube is partially received within the air inlet of the nozzle.

17. The nozzle of claim 16, wherein the nozzle is adapted to produce a second oscillating airstream exiting the secondary air outlet.

18. The nozzle of claim 16, wherein the nozzle is adapted to produce a second non-oscillating airstream exiting the secondary air outlet.

19. The nozzle of claim 16, wherein the first mating half defines a first mating edge comprising a tongue adapted to engage a groove formed in a second mating edge of the second mating half when the first and second mating halves are assembled.

20. The nozzle of claim 16, wherein the first and second mating halves contact one another along a plane containing the long axis of the air outlet.

21. The nozzle of claim 16, wherein the air inlet is obround in shape.

* * * * *